United States Patent
Shih et al.

(10) Patent No.: US 8,769,317 B2
(45) Date of Patent: Jul. 1, 2014

(54) USB HUB FOR SUPPLYING POWER UPON DETERMINATION WHETHER A USB DEVICE IS CHARGEABLE ACCORDING TO DATA TRANSFER RATE OF THE USB DEVICE

(75) Inventors: Terrance Shih, New Taipei (TW); Chin-Sung Hsu, New Taipei (TW); Chun-Heng Lin, New Taipei (TW)

(73) Assignee: Via Technologies, Inc., New Taipei (TW)

( * ) Notice: Subject to any disclaimer, the term of this patent is extended or adjusted under 35 U.S.C. 154(b) by 273 days.

(21) Appl. No.: 13/354,895

(22) Filed: Jan. 20, 2012

(65) Prior Publication Data

US 2013/0191653 A1 Jul. 25, 2013

(51) Int. Cl.
G06F 1/00 (2006.01)
H04B 1/38 (2006.01)

(52) U.S. Cl.
USPC ............................ 713/300; 713/323; 455/573

(58) Field of Classification Search
USPC ........................................................ 713/300
See application file for complete search history.

(56) References Cited

U.S. PATENT DOCUMENTS

| | | | |
|---|---|---|---|
| 7,908,414 B2* | 3/2011 | Combs et al. | 710/62 |
| 2012/0042185 A1* | 2/2012 | Lee et al. | 713/323 |
| 2012/0139474 A1* | 6/2012 | Cho et al. | 320/106 |
| 2012/0210146 A1* | 8/2012 | Lai et al. | 713/310 |
| 2013/0154551 A1* | 6/2013 | Jeansonne et al. | 320/107 |
| 2013/0190059 A1* | 7/2013 | Song et al. | 455/573 |

* cited by examiner

*Primary Examiner* — Suresh Suryawanshi
(74) *Attorney, Agent, or Firm* — McClure, Qualey & Rodack, LLP

(57) ABSTRACT

A USB hub and a method thereof. The USB hub supplies power to a USB device, is connected between the USB device and a USB host under a working power state, and comprises an upstream port, a downstream port, a power port, and a controller. The upstream port is coupled to the USB host. The downstream port is coupled to the USB device. The power port is coupled to a power source. The controller is coupled to the upstream port, the downstream port, and the power port, and determines whether the USB host has left the working power state, and determines whether the USB device is electrically chargeable, when the USB host has left the working power state. The downstream port provides power to the USB device from the power source when the USB device is electrically chargeable.

20 Claims, 4 Drawing Sheets

USB HUB FOR SUPPLYING POWER UPON DETERMINATION WHETHER A USB DEVICE IS CHARGEABLE ACCORDING TO DATA TRANSFER RATE OF THE USB DEVICE

BACKGROUND OF THE INVENTION

1. Field of the Invention

The present invention relates to a Universal Serial Bus (USB) composite device, and in particular relates to a USB hub capable of supplying power to a USB device, and a method thereof.

2. Description of the Related Art

The USB interface is an industry standard developed in the mid-1990s that supports data exchange between a USB host and a wide range of simultaneously accessible USB devices. The USB devices can be attached to the USB host through a USB hub. The attached USB devices share USB bandwidth through a host-scheduled, token-based protocol. The USB interface allows the USB devices to be attached, configured, used, and detached while the USB host and other USB devices are in operation.

Conventionally, a USB host may provide power to USB devices connected thereto during the USB host is in a working power state. Nevertheless, the USB host stops providing power to the connected USB devices when the host becomes inactive. Accordingly, there is a need to provide power for USB devices when the USB host is in an inactive state, e.g., through providing a power management device and method to supply an alternate power independent of the host power.

BRIEF SUMMARY OF THE INVENTION

In one aspect of the invention, a method is described, supplying power to a USB device by a USB hub connected between the USB device and a USB host under a working power state, wherein the USB hub is coupled to a power source. The method comprises: determining whether the USB host has left the working power state; determining whether the USB device is electrically chargeable, when the USB host has left the working power state; and providing power to the USB device from the power source when the USB device is electrically chargeable.

In another aspect of the invention, a USB hub is disclosed, supplying power to a USB device, connected between the USB device and a USB host under a working power state, comprising an upstream port, a downstream port, a power port, and a controller. The upstream port is coupled to the USB host. The downstream port is coupled to the USB device. The power port is coupled to a power source. The controller is coupled to the upstream port, the downstream port, and the power port, and determines whether the USB host has left the working power state, and determines whether the USB device is electrically chargeable, when the USB host has left the working power state. The downstream port provides power to the USB device from the power source when the USB device is electrically chargeable.

Other aspects and features of the present invention will become apparent to those with ordinarily skill in the art upon review of the following descriptions of specific embodiments of apparatuses, systems, and methods for power management of a USB device when an attached USB host is under power suspension. Traditionally, the USB hub cuts the power supply for all direct or indirect connected USB devices, upon detecting that the computer has entered a sleep or disconnect power state. In the present invention, the USB hub provides power through a power source to charge up the connected USB device when the USB host is in a sleep or disconnect power state.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The USB specifications and the USB Battery Charging specifications are used to teach the spirit of the invention, and the invention is not limited thereto.

Figure 1:
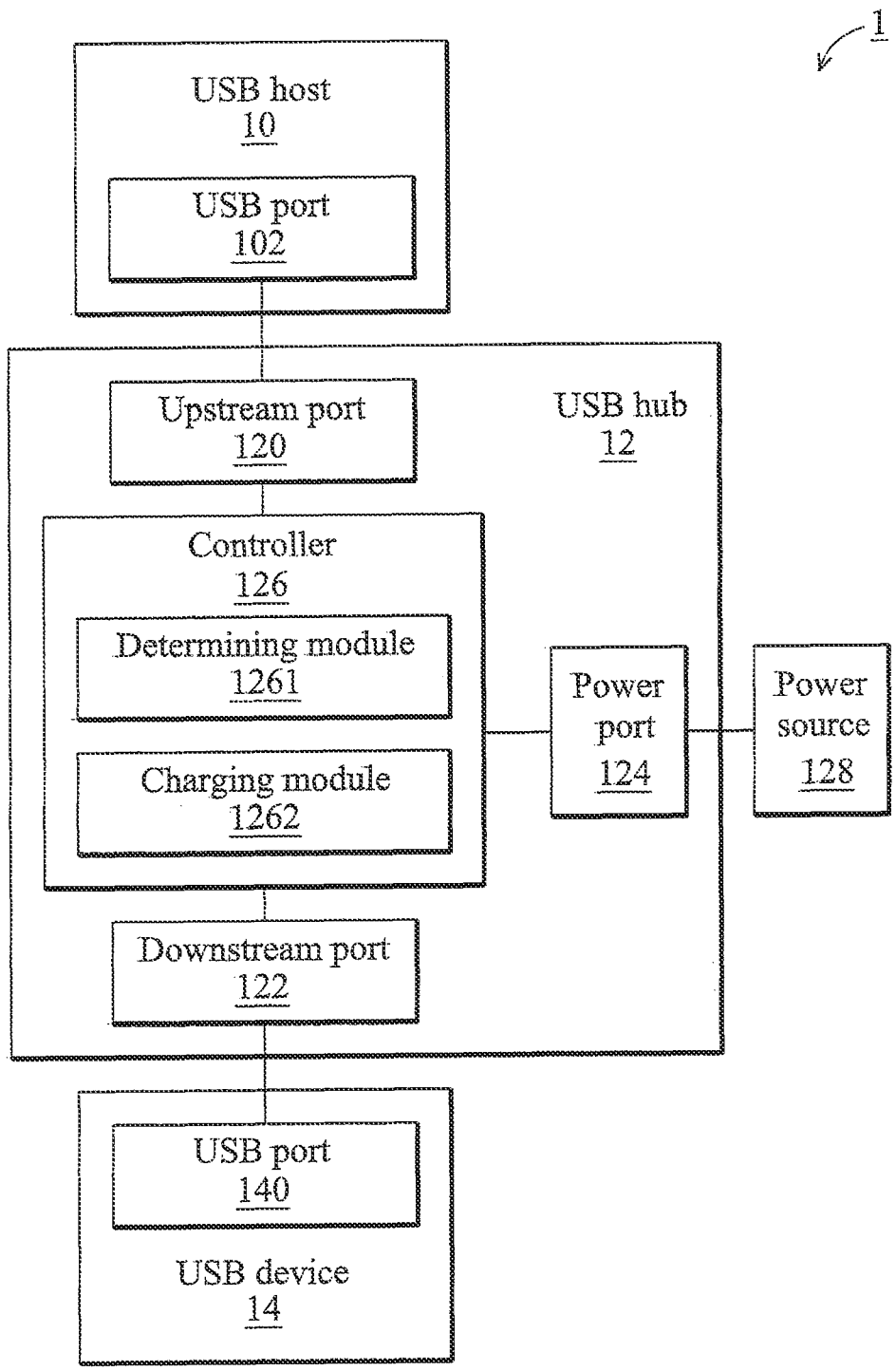
FIG. 1 is a block diagram illustrating a USB system according to an embodiment of the invention.

FIG. 1 is a block diagram illustrating a USB system 1 according to an embodiment of the invention. The USB system 1 comprises a USB host 10, a USB hub 12, and a USB device 14. The USB host 10 is coupled to the USB hub 12, and subsequently to the USB device 14 via the USB hub 12. The USB hub 12 comprises an upstream port 120, a downstream port 122, a power port 124, and a controller 126. The controller 126 is coupled to the upstream port 120, the downstream port 122, and the power port 124. The power port 124 is coupled to a power source 128. The upstream port 120 is coupled to a USB port 102 of the USB host to as a data communication path and a power transmission path between the USB host 10 and the USB hub 12. The downstream port 122 is coupled to a USB port 140 of the USB device 14 as a data communication path and a power transmission path between the USB hub 12 and the USB device 14. Thus the USB hub 12 is able to perform a data communication media or a charging media between the USB device 14 and the USB host 10 in a working power state.

The controller 126 comprises a determining module 1261 and charging module 1262. The determining module 1261 is able to detect a power state of the USB host 10 to determine whether the USB host 10 has left the working power state. When the power state of the USB host 10 indicates that the USB host is in the working power state, the controller 126 receives power from the USB host 10 to charge the USB device 14. On the other hand, once the power state of the USB host 10 indicates that the USB host 10 has left the working power state to enter a power-saving state, the determining module 1261 then determines that whether the USB device 14 is electrically chargeable. When the USB host 10 has left the working power state and the USB device 14 is electrically chargeable, the charging module 1262 would supply the power from the power source 128 to charge the USB device 14. The working power state is a normal operation state, such as the S0 power state defined by the Advanced Configuration and Power Interface (ACPI). The power-saving state is a sleep state, a suspension state, or a soft off state, such as the S3, S4 or S5 state defined by ACPI. To sum up, the USB hub 12 can provide power receive from the USB host 10 to the USB device 14 when the USB host 10 is in the working power state, i.e., S0 state. In particular, the USB hub 12 can acquire the power from the power source 128 to the electrically chargeable USB device 14 when the host 10 has left the working power state, i.e., any power state apart from the S0 state. The power source 128 would be an alternate power source, such as battery cell, a wall adaptor, a car power adaptor, or other independent power sources.

As mentioned above, the determining module 1261 is able to determine whether the USB host 10 has left the working power state. Software detection and hardware detection can be implemented by the determining module 1261. For the software detection, the determining module 1261 may determine that the USB host 10 has left the working power state when receiving a power-saving command from the USB host 10. The power-saving command comprises the information that the USB host 10 performs a power-saving procedure to enter the power-saving state (S3, S4 or S5). For the hardware detection, the determining module 1261 may detect a predetermined power level on the upstream port 120 to determine whether the USB host 10 has left the working power state. Once the power level supplied by the USB host 10 on the upstream port 120 is not the predetermined power level, the determining module 1261 determines that the USB host 10 has left the working power state. Preferably, the determining module 1261 may detect a voltage level on a power pin of the upstream port 120 and may determine the USB host 10 has left the working power state when voltage level on the power pin of the upstream port 120 is not 5 volt. Furthermore, the determining module 1261 may determine whether the USB host 10 has left the working power state based on a physical attachment between the USB host and the USB hub 12. When the USB host 10 is detached from the USB hub 12, the voltage level supplied by the USB host 10 on the upstream port 120 is disabled. And then the determining module 1261 determines that the USB host 10 has left the working power state due to the disabled voltage level on the upstream port 120. Otherwise, the determining module 1261 continues to monitor the physical attachment between the USB host 10 and the USB hub 12.

The downstream port 122 includes at least one differential signal pair pins, a power pin and a ground pin. The differential signal pair pins are configured to carry differential signal at different data transfer rates, such as a super speed at 5 Gbps, a high speed at 480 Mbps, a full speed at 12 Mbps, or a low speed at 1.5 Mbps. Different device types of the USB device 14 may support different data transfer rates. The data transfer rate of the USB device 14 represents a device type thereof. For example, the super speed device (USB 3.0 device) may support the data transfer rate at 5 Gbps. The high speed device (USB 2.0 device) may support the data transfer rate at 480 Mbps. The full speed (USB 1.0 device) may support may support the data transfer rate at 12 Mbps or low 1.5 Mbps. Typically, the USB 1.0 device comprises simple peripheral devices such as keyboards, mice, joysticks, and other low-power devices which do not have charging requirement. Commercial electrical apparatus having the charging requirement are usually USB 3.0 or USB 2.0 devices. The determining module 1261 may obtain a data transfer rate of the USB device 14 when the USB device 14 is attached to the USB hub 12 and determines whether the USB device 14 is electrically chargeable according to the obtained data transfer rate of the USB device 14. In some embodiments, the determining module 1261 may determine that the USB device 14 is electrically chargeable when the obtained data transfer rate of the USB device 14 indicates the USB device 14 is a USB 2.0 device or USB 3.0 device, for example, when the obtained data transfer rate of the USB device 14 is not less than 480 Mbps.

When the USB host 10 has left the working power state and the USB device 14 is chargeable, the charging module 1262 may provide the power from the power source 128 to the USB device 14 in several charging settings according to the characteristic of the USB device 14. For example, the determining module 1261 may further determine that whether the USB device 14 supports a specific charging setting, such as a charging downstream port (CDP) charging setting. Then the charging module 1262 may acquire the power from the power source 128 to charge the USB device 14 in a proper charging setting when the USB host 10 has left the working power state and the USB device 14 supports the specific charging setting. Taking the CDP charging setting for example, determining whether USB device 14 supports the CDP charging setting needs a signal communication between the USB hub 12 and the USB device 14. The signal communication may be performed through a differential signal pair pins of the downstream port 122, such as a positive data pin (D+) and a negative data pin (D−) defined in accordance with USB 2.0 Specification. The signal communication may be divided into three steps. Firstly, when the USB device 14 which is a CDP device is coupled to the USB hub 12, the USB device 14 may transmits a first signal with a first predetermined voltage level to the USB hub 12 via the positive data pin of the downstream port 122 for informing that the USB device 14 is connected to the USB hub 12. Secondly, the determining module 1261 may response a second signal with the same first predetermined voltage level on the negative data pin of the downstream port 122 back to the USB device 14 for informing that the downstream port 122 is a charging port. Then, the USB device 14 may transmit a pull-up signal to the USB hub 12 on the positive data pin or the negative data pin for informing the USB hub 12 that the USB device 14 may be charged in the CDP charging setting. Preferably, the first predetermined voltage level is different from the voltage level of the pull-up signal. The voltage level of the pull-up signal and first predetermined voltage level are respectively 5 volt and 0.6 volt. After the USB device 14 transmitting the pull-up signal to the USB hub 12, the voltage level of one of the positive data pin and negative pin is the first predetermined voltage level, and the voltage level of the other is a voltage of the pull-up signal. Therefore, a voltage level difference exists between the positive data pin and the negative data pin while the voltage level of the pull-up signal is different from the first predetermined voltage level. The USB hub 12 may store the voltage level difference as a CDP flag in a memory thereof (not shown) to indicate that the USB device 14 is a CDP device. Later, the determining module 1261 can read the CDP flag for CDP determination and the charging module 1262 may acquire the power from the power source 128 to charge to the USB device 14 in the CDP charging setting after the USB host 10 has left the working power state.

Hereafter is another charging setting determination according to an embodiment of the invention incorporating the USB system 1 in FIG. 1. After the USB host 10 has left the working power state, the USB hub 12 may provide different charging settings suitable for the USB device 14 according to the characteristic thereof The determining module 1261 may provide a querying signal to the USB device 14 via the positive data pin and/or negative pin, and then determine whether the USB device 14 is compliant with a specific charging setting according to a response signal responded by the USB device 14 via the positive data pin and/or negative pin. For example, the determining module 1261 may provide a first voltage level on the positive data pin, and provide a second voltage level on the negative data pin respectively to the USB device 14 as the querying signal. Preferably, the first voltage level and the second voltage are different. Then the determining module 1261 then determines whether the USB device 14 is compliant with the specific charging setting according to the voltage levels on the positive data pin and/or the negative data pin responded by the USB device 14. When the USB device 14 is compliant with the specific charging setting, the charging module 1262 may acquire the power from the power source 128 to provide a charging current to the USB device 14 according to the specific charging setting.

In one embodiment of the present invention, the determining module 1261 determines that the USB device 14 is compliant with a first charging setting when the voltage level responded by the USB device 14 on the positive data pin is maintained at the first voltage level. Preferably, the first charging setting may be suitable for dedicated USB peripherals provided by a specific vendor. For example, the first charging setting is arranged for Apple device, such as Apple iPhone. For the first charging setting for Apple device, the first voltage level and the second voltage may be 2.7 Volt and 2.0 Volt respectively. The charging current for the Apple device may be up to 1.5 A. It is worthy to note that the voltage levels of first voltage level and the second voltage level could be set to different values to match with the specific vendor's design.

In another embodiment of the present invention, the determining module 1261 determines that the USB device 14 is compliant with a second charging setting when the voltage level responded by the USB device 14 on the positive data pin is changed. Then the charging module 1262 may provide a charging current to USB device 14 according to the second charging setting. For example, the determining module 1261 determines the USB device 14 is compliant with the second charging setting when the voltage level responded by the USB device 14 on the positive data pin is dropped from the first voltage level to the second voltage level. Preferably, the magnitudes of the first voltage level and the second voltage level are different. The first voltage level and the second voltage may be 2.7 Volt and 2.0 Volt respectively. The charging module 1262 then shorts the positive data pin and the negative pin and then provide a charging current to the USB device 14 according to the second charging setting. Preferably, the second charging setting is a dedicated charging port (DCP) charging setting and the charging current according to the DCP charging setting may be up to 1.8 A. Details of the DCP can be found in the USB Battery Charging Specification, Revision 1.1, published by the USB Implementers Forum, Inc. (www.usb.org) on Apr. 15, 2009.

Although only one USB hub 12 and only one USB device 14 are illustrated in FIG. 1, those skilled in the art will appreciate that more hubs 12 and USB devices 14 may be implemented for the USB system 1 without deviating from the principle of the invention. People skilled in the art may also recognize that one or more USB downstream ports 122 may be implemented for the USB host 10. Although the USB host 10, the USB hub 12, and the device 14 are shown as separate entities in FIG. 1, the USB hub 12 may be incorporated into the USB host 10 or the USB device 14 without departing from the principle of the invention. Unlike the traditional approach, the USB hub 12 in the invention functionally enables the USB charger once the USB host 10 has left the working power state, allowing the USB device 14 to be charged from the power source 128 rather than the USB host 10 when the USB host 10 has left the working power state or disconnected from the USB hub 12.

Figure 2:
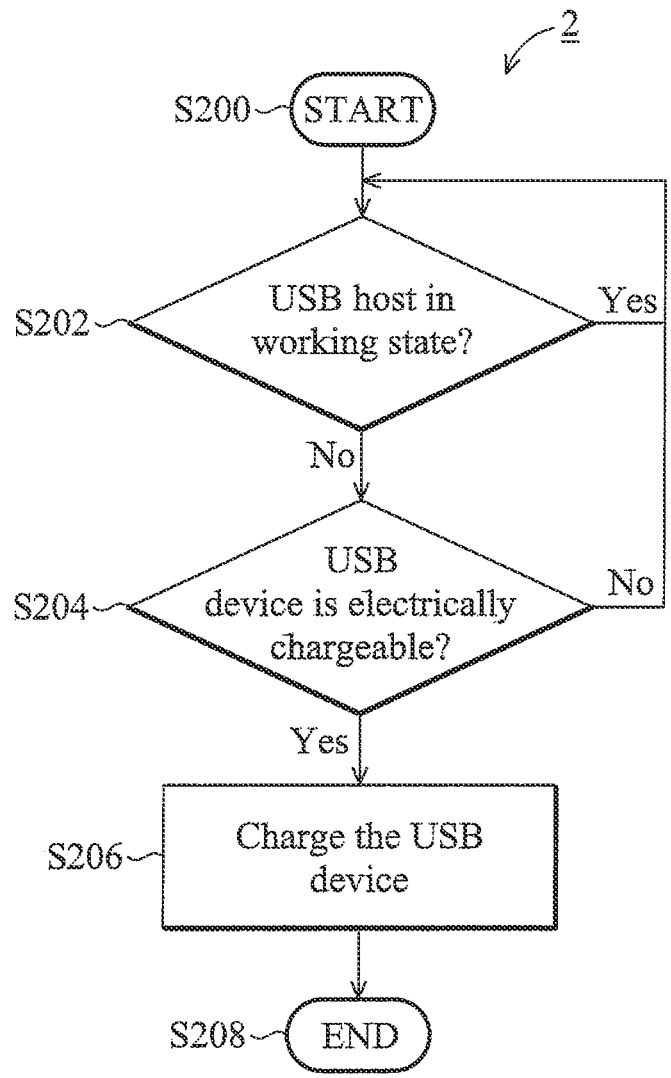
FIG. 2 is a flowchart of an exemplary power supply method performed by the USB hub according to an embodiment of the invention.

FIG. 2 is a flowchart of an exemplary power supply method performed by the USB hub 10 according to an embodiment of the invention, incorporating the USB system 1 in FIG. 1.

Refer to FIGS. 1 and 2, upon startup, the USB host 10 is under a working power state. The USB hub 12 is coupled to the USB host 10 and the USB device 14, and the power to the USB device 14 is supplied by the USB host 10 through the USB hub 12 (S200). The USB hub 12 may regularly determine whether the USB host 10 has left the working power state (S202). As mentioned above, the USB hub 12 can determine whether the USB host 10 has left the working power state by software detection or hardware detection. When the USB host 10 remains in the working power state, the USB hub 12 continues to monitor the USB host 10 (S202). When the host 10 has left the working power state, the USB hub 12 then determines whether the connected USB device 14 is electrically chargeable (S204). When the USB host 10 is has left the working power state and the USB device 14 is electrically chargeable, the USB hub 12 supplies a charging current to the USB device 14 from the power source 128 (S206). When the USB device 14 is not chargeable, the USB hub 12 keeps checking whether the host has returned to the working power state. In some embodiments, the USB hub 12 detects whether the device 14 is electrically chargeable by obtaining a data transfer rate of the device 14. The USB hub 12 may determine that the USB device 14 is electrically chargeable when the obtained data transfer rate of the USB device 14 is a USB 2.0 device or a USB 3.0 device. In other words, the obtained data transfer rate of the USB device 14 is not less than 480 Mbps.

Figure 3:
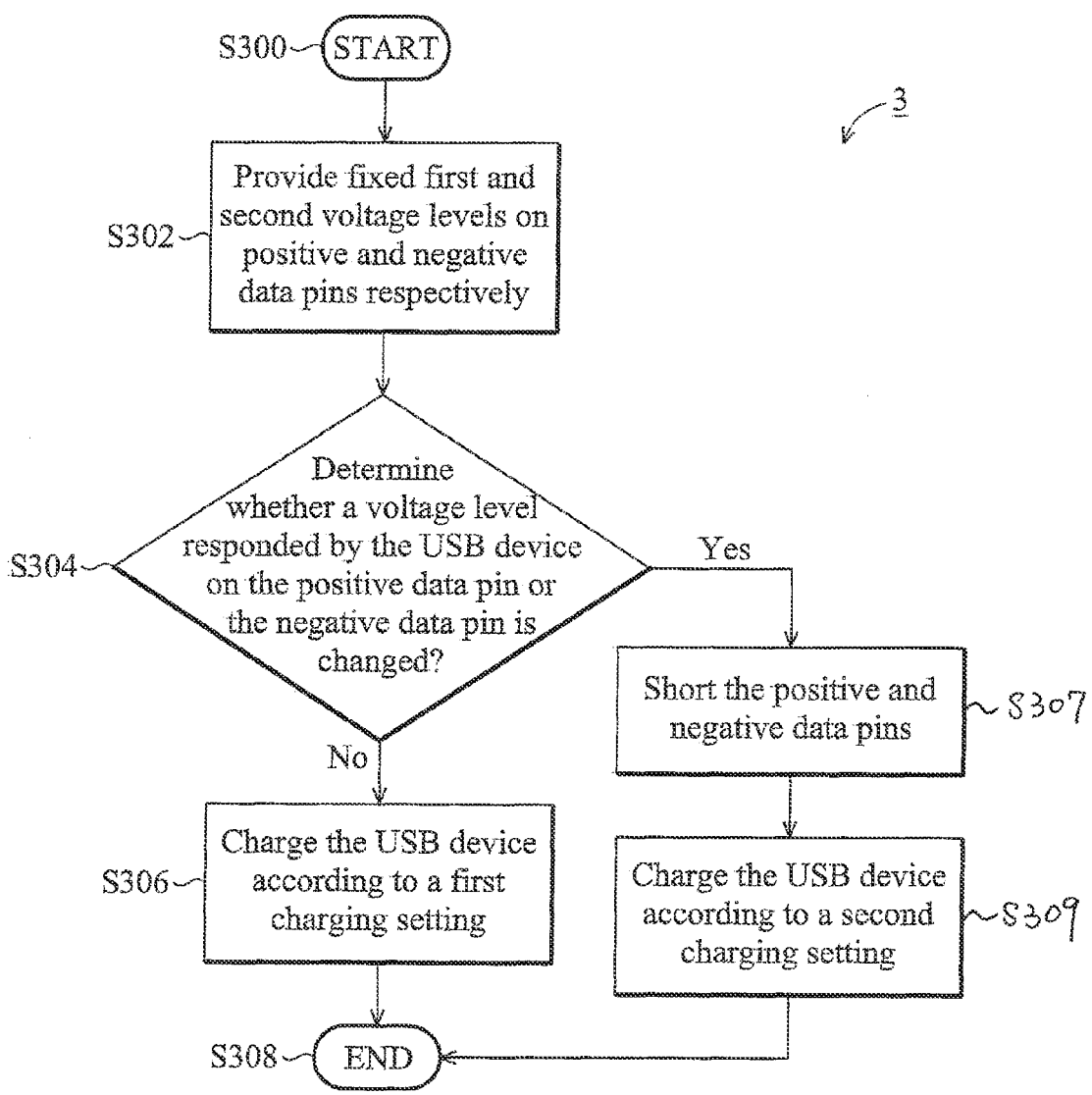
FIG. 3 is a flowchart of an exemplary charging setting detecting method incorporated for the power supply method in FIG. 2

FIG. 3 is a flowchart of an exemplary charging setting detecting method incorporated for the power supply method in FIG. 2.

Refer to FIGS. 1 and 3, upon startup, the USB hub 12 is initialized (S300). The USB hub 12 provides a first voltage level and a second voltage level on a positive data pin and a negative data pin of the downstream port 122 respectively (S302). In one embodiment, the magnitudes of the first voltage level and the second voltage level are different. For example, the first voltage level is 2.7V and the second voltage level is 2.0 V. The hub 12 then determines whether a voltage level responded by the USB device 14 on the positive data pin or the negative data pin is changed, for example, determines whether a voltage level responded by the USB device 14 on the positive data pin is dropping from the first voltage level to the second voltage level, or determines whether a voltage level responded by the USB device 14 on the negative data pin is pulled up from the second voltage level to the first voltage level (S304). When the voltage level responded by the USB device 14 on the positive pin or the negative data pin is maintained, the USB hub 12 determines that the USB device 14 is compliant with a first charging setting, and thus the USB hub 12 acquires the power from the power source 128 to charge the USB device 14 according to the first charging setting (S306). Preferably, the charging current according to the first charging setting may be up to 1.5 A. Otherwise, when the voltage level responded by the USB device 14 on the positive pin or the negative data pin is changed, the USB hub 12 may subsequently determine the USB device 14 is compliant with a second charging setting afterwards. The USB hub 12 may firstly short the positive data pin and the negative data pin (S307), and then provides a charging current to the USB device 14 according to the second charging setting (S309). Preferably, the charging current according to the second charging setting may be up to 1.8 A.

Figure 4:
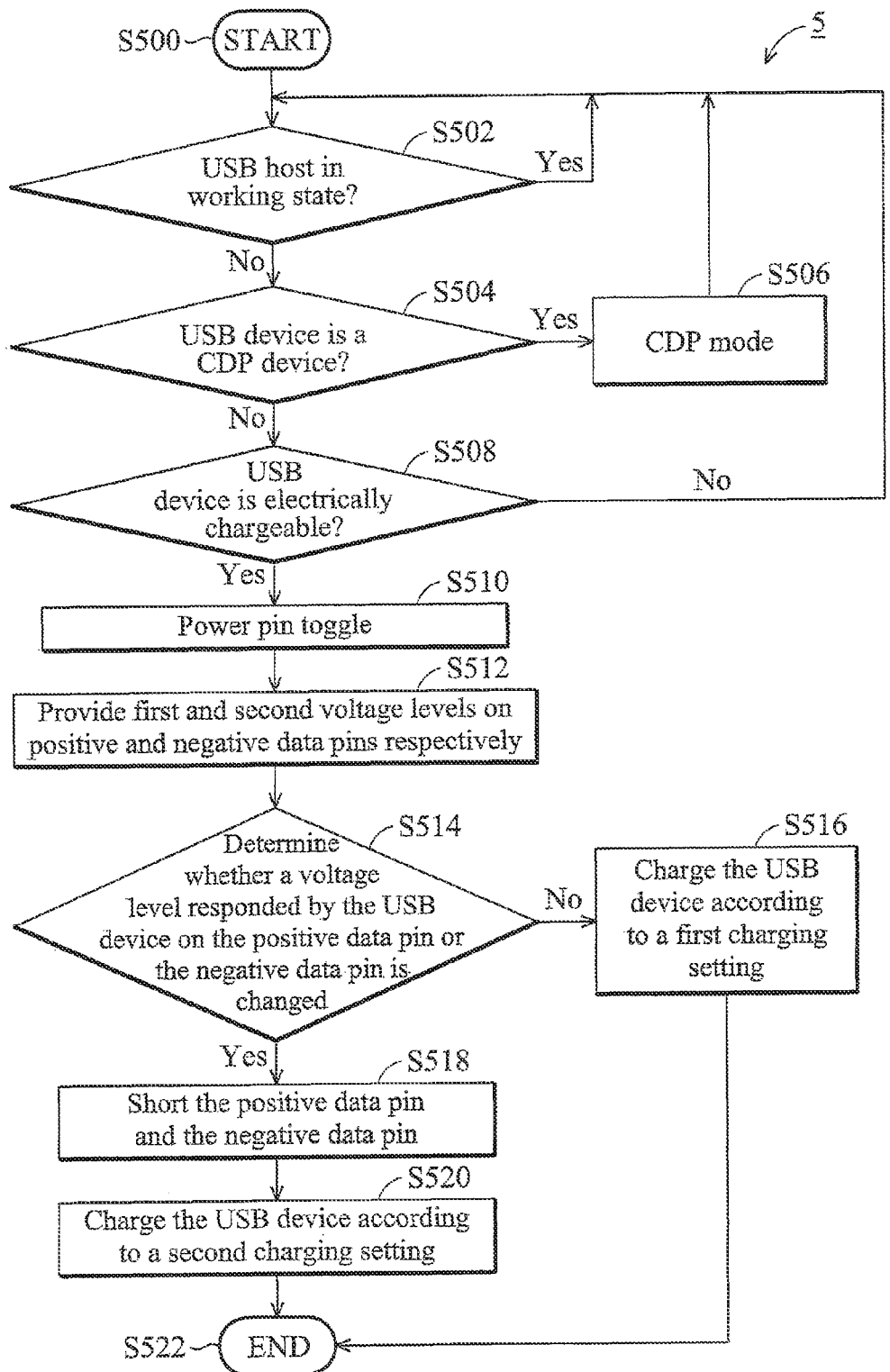
FIG. 4 is a flowchart of another exemplary power supply method according to an embodiment of the invention, incorporating the USB system in FIG. 1.

FIG. 4 is a flowchart of another exemplary power supply method according to an embodiment of the invention, incorporating the USB system 1 in FIG. 1.

Refer to FIGS. 1 and 4, upon startup, the USB host 10 is under a working power state, and the USB hub 12 is coupled to the USB host 10 and the USB device 14, wherein the power to the USB device 14 is supplied by the USB host 10 through the USB hub 12 (S500). The USB hub 12 regularly determines whether the USB host 10 has left the working power state by a hardware detection or a software detection (S502). Step 502 may be identical to Step S202, thus the explanation can be found in the description for FIG. 2, and will not be repeated again for brevity. When the USB host 10 leaves the working power state to enter a power-saving state, the USB hub 12 then determines whether the connected USB device 14 is a CDP device by checking the CDP flag (S504). When the USB device 14 is a CDP device, the USB hub 12 may supply a charging current according to the CDP mode to the USB device 14 (S506). When the device 14 is not a CDP device, the USB hub 12 next determines whether the USB device 14 is electrically chargeable according to a data transfer rate of the USB device (S508), as explained in Step S204 in FIG. 2. For the case that the USB device 14 is not electrically chargeable, the USB hub 12 returns to Step S502 to check whether the host has re-entered the working power state. For the case that the device 14 is electrically chargeable, the USB hub 12 may supply the charging current to the USB device 14 from the power source 128 afterwards. Once the USB hub 12 determines that the USB device 14 is electrically chargeable, the USB hub 12 performs a power pin toggle on the USB connection between the USB hub 12 and the USB device 14 (S510). The power pin toggle may be implemented as disabling the voltage level on the power pin for a predetermined period and then enabling the voltage level on the power pin for building a link between the USB hub 12 and the USB device 14. Preferably, the enabling voltage level on the power pin is 5 volt, and the predetermined period is 1 second. To determine whether the USB device 14 is compliant with the first charging setting described in FIG. 3, the USB hub 12 carries out Step S512 and S514, which are identical to Step S302 and S304. When USB device 12 is compliant with the first charging setting, the USB hub 12 then provides the power from the power source 128 to charge the USB device 14 according to the first charging setting (S516). When the USB device 12 is not compliant with the first charging setting, the USB hub 12 short the positive data pin and the negative data pin of the downstream port 122 (S518) and then provides the power from the power source 128 to charge the USB device 14 according to the second charging setting (S520).

As used herein, the term "determining" encompasses calculating, computing, processing, deriving, investigating, looking up (e.g., looking up in a table, a database or another data structure), ascertaining and the like. Also, "determining" may include resolving, detecting, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, supplying power to a USB device by a USB hub connected between the USB device and a USB host, wherein the USB hub is coupled to a power source, the method comprising:
    determining whether the USB host has left a working power state;
    obtaining a data transfer rate of the USB device when the USB host has left the working power state;
    determining whether the USB device is electrically chargeable according to the obtained data transfer rate of the USB device; and
    supplying the power to the USB device from the power source when the USB device is electrically chargeable.

2. The method of claim 1, wherein the step of determining whether the USB device is chargeable comprises:
    determining that the USB device is electrically chargeable when the obtained data transfer rate of the USB device indicates the USB device is a USB 2.0 device or a USB 3.0 device.

3. The method of claim 1, wherein the USB hub is connected to the USB device via a downstream port comprising a positive data pin and a negative data pin, and the step of supplying the power to the USB device from the power source when the USB device is electrically chargeable further comprises:
    providing a first voltage level and a second voltage level on the positive data pin and the negative data pin respectively to the USB device;
    determining whether a voltage level responded by the USB device on the positive data pin or the negative data pin is changed; and
    providing the power to the USB device according to a first charging setting when the voltage level responded by the USB device on the positive data pin or the negative data pin remains unchanged.

4. The method of claim 1, wherein the USB hub is connected to the USB device via a downstream port comprising a positive data pin and a negative data pin, and the step of supplying the power to the USB device from the power source when the USB device is electrically chargeable further comprises:
    providing a first voltage level and a second voltage level on the positive data pin and the negative data pin respectively to the USB device;
    determining whether a voltage level responded by the USB device on the positive data pin or the negative data pin is changed;
    shorting the positive data pin and the negative data pin when a voltage level responded by the USB device on the positive data pin or the negative data pin is changed; and
    providing the power from the power source to the USB device according to a second charging setting.

5. The method of claim 1, further comprising:
    determining whether the USB device supports a charging downstream port (CDP); and supplying the power to the USB device from the power source in a CDP mode when the USB device supports the CDP.

6. The method of claim 5, wherein the USB hub is connected to the USB device via a downstream port comprising a positive data pin and a negative data pin, and the step of determining whether the USB device supports the charging downstream port (CDP) comprises:
receiving a first signal with a predetermined voltage level on the positive data pin from the USB device;
transmitting a second signal with the predetermined voltage level on the negative data pin to the USB device in response to the first signal; and
determining that the USB device supports the CDP when receiving a pull-up signal from the USB device on the positive data pin or the negative data pin, wherein a voltage level of the pull-up signal is larger than the predetermined voltage level.

7. The method of claim 1, wherein the step of determining whether the USB host has left the working power state comprises:
receiving a power-saving command from the USB host; and
determining that the USB host has left the working power state according to the received power-saving command.

8. The method of claim 1, wherein the USB hub is connected to the USB host via an upstream port, the step of determining whether the USB host has left the working power state comprises:
determining the USB host has left the working power state when a voltage level on the upstream port is not a predetermined voltage level.

9. The method of claim 1, wherein the step of determining whether the USB host has left the working power state comprises:
determining that the USB host is detached from the USB hub.

10. A USB hub, supplying power to a USB device, connected between the USB device and a USB host, comprising:
a downstream port, coupled to the USB device;
a power port coupled to a power source; and
a controller coupled to the downstream port and the power port, the controller comprising:
a determining module configured to determine whether the USB host has left a working power state, obtain a data transfer rate of the USB device when the USB host has left the working power state, and determine whether the USB device is electrically chargeable according to the obtained data transfer rate of the USB device; and
a charging module configured to supply the power to the USB device from the power source when the USB device is electrically chargeable.

11. The USB hub of claim 10, wherein the determining module determines that the USB device is electrically chargeable when the obtained data transfer rate of the USB device indicates the USB device is a USB 2.0 device or a USB 3.0 device.

12. The USB hub of claim 10, wherein the downstream port comprises a positive data pin and a negative data pin;
the determining module provides a querying signal to the USB device via the positive data pin and/or the negative data pin, and determines whether the USB device is compliant with a charging setting according to a response signal responded by the USB device via the positive data pin and/or negative pin; and
the charging module provides the power from the power source to the USB device according to the charging setting.

13. The USB hub of claim 12, wherein the determining module provides a first voltage level and a second voltage level on the positive data pin and on the negative data pin respectively as the querying signal, and determines whether the USB device is compliant with the charging setting according to a voltage level responded by the USB device on the positive data pin as the response signal.

14. The USB hub of claim 13, wherein the determining module determines whether a voltage level responded by the USB device on the positive data pin is the first voltage level; and
the charging module provides the power to the USB device according to a first charging setting when the voltage level responded by the USB device on the positive data pin is the first voltage level.

15. The USB hub of claim 13, wherein the determining module determines whether a voltage level responded by the USB device on the positive data pin is a predetermined voltage level different from the first voltage level; and
the charging module shorts the positive data pin and the negative data pin when the voltage level responded by the USB device on the positive data pin is the predetermined voltage level, and provides the power from the power source to the USB device according to a second charging setting after the positive data pin and the negative data pin are shorted.

16. The USB hub of claim 10, wherein the determining module further determines whether the USB device supports a charging downstream port (CDP), and the charging module supplies the power to the USB device from the power source in a CDP mode when the USB host supports the CDP.

17. The USB hub of claim 16, wherein the downstream port comprises a positive data pin and a negative data pin;
the determining module receives a first signal with a predetermined voltage level on the positive data pin from the USB host, and transmits a second signal with the predetermined voltage level on the negative data pin in response to the first signal, and determines that the USB device supports the CDP when receiving a pull-up signal from the USB device on the positive data pin or the negative data pin,
wherein a voltage level of the pull-up signal is larger than the predetermined voltage level.

18. The USB hub of claim 10, wherein the determining module determines that the USB host has left the working power state by receiving a power-saving command from the USB host.

19. The USB hub of claim 10, wherein the determining module determines that the host has left the working power state when a voltage level on an upstream port is not a predetermined voltage level.

20. The USB hub of claim 10, wherein the controller determines that the USB host has left the working power state when the USB host is detached from the USB hub.

* * * * *